United States Patent
Bergeson et al.

(10) Patent No.: US 10,570,949 B2
(45) Date of Patent: Feb. 25, 2020

(54) DAMAGE TOLERANT AND FAIL-SAFE (DTFS) HIGH STRENGTH PRELOADED PIN ASSEMBLY

(71) Applicant: The Boeing Company, Chicago, IL (US)

(72) Inventors: Blake J. Bergeson, Gilbert, AZ (US);
Joshua J. Bracken, Gilbert, AZ (US);
Michael G. Poulson, Mesa, AZ (US);
Martin J. Clauss, Gilbert, AZ (US);
Gunnar P. Bergeson, Queen Creek, AZ (US)

(73) Assignee: THE BOEING COMPANY, Chicago, IL (US)

( * ) Notice: Subject to any disclaimer, the term of this patent is extended or adjusted under 35 U.S.C. 154(b) by 988 days.

(21) Appl. No.: 15/073,076

(22) Filed: Mar. 17, 2016

(65) Prior Publication Data

US 2017/0267340 A1 Sep. 21, 2017

(51) Int. Cl.
*F16C 11/04* (2006.01)
*B64C 27/48* (2006.01)
*B64C 27/51* (2006.01)

(52) U.S. Cl.
CPC ........... *F16C 11/045* (2013.01); *B64C 27/48* (2013.01); *B64C 27/51* (2013.01); *Y10T 403/32918* (2015.01); *Y10T 403/75* (2015.01)

(58) Field of Classification Search
CPC ....... B64C 27/48; B64C 27/51; B64C 27/635; F16B 19/02; F16B 33/00; F16B 37/14;
(Continued)

(56) References Cited

U.S. PATENT DOCUMENTS 4,795,310 A   1/1989   McArdle et al.
5,120,195 A * 6/1992   Schmaling ............. B64C 27/35
                                              416/134 A
(Continued)

FOREIGN PATENT DOCUMENTS

FR          745143 A  *  5/1933  ............. F16C 11/02
FR     2 991 289 A1     12/2013
(Continued)

OTHER PUBLICATIONS

"Resolution of Forces." the Physics Classroom. [online], [retrieved on Jan. 8, 2019]. Retrieved from the Internet. <URL: https://www.physicsclassroom.com/class/vectors/Lesson-3/Resolution-of-Forces>.*

(Continued)

*Primary Examiner* — Josh Skroupa
(74) *Attorney, Agent, or Firm* — MH2 Technology Law Group LLP

(57) ABSTRACT

A hinge assembly such as a lead-lag hinge can include a hinge pin assembly. The hinge pin assembly can include an outer cylinder, a shear pin that extends through the outer cylinder and having a first threaded end and a second threaded end, a first nut threaded on the first threaded end and a second nut threaded on the second end. An opposing force between the first nut and the second nut applies a compressive stress to the outer cylinder that may increase a resistance of the hinge pin assembly to wear and damage. In the case of complete failure of the outer cylinder, the shear pin can maintain structural integrity of the hinge pin assembly and of the hinge assembly.

20 Claims, 11 Drawing Sheets

(58) Field of Classification Search
CPC .................. F16C 11/02; F16C 11/045; Y10T 403/32893–32918; Y10T 403/75
USPC ....................... 403/154–157, 408.1
See application file for complete search history.

(56) References Cited

U.S. PATENT DOCUMENTS

| | | | | |
|---|---|---|---|---|
| 5,209,594 | A * | 5/1993 | Svensson | F16C 11/02 403/156 |
| 5,979,618 | A * | 11/1999 | Sieg | B64C 27/51 188/322.19 |
| 6,877,259 | B2 * | 4/2005 | Nishimura | E02F 9/006 37/403 |
| 7,878,752 | B2 * | 2/2011 | Schmeling | F16C 11/045 37/468 |
| 8,221,020 | B2 * | 7/2012 | Svensson | F16C 11/02 403/156 |
| 8,500,407 | B1 | 8/2013 | Kennedy et al. | |
| 8,596,666 | B1 * | 12/2013 | Hansen | F16C 11/02 403/154 |
| 8,920,086 | B2 * | 12/2014 | Stecher | F16B 19/02 411/57.1 |
| 9,140,291 | B2 * | 9/2015 | Yoon | F16B 37/14 |
| 9,682,773 | B2 * | 6/2017 | Kennedy | B64C 27/48 |
| 9,726,211 | B2 * | 8/2017 | Orgeron | F16B 19/02 |
| 2009/0199365 | A1 * | 8/2009 | Svensson | F16C 11/045 16/386 |
| 2010/0230547 | A1 | 9/2010 | Tayman | |
| 2015/0308473 | A1 * | 10/2015 | Stenbom | F16B 7/182 411/44 |

FOREIGN PATENT DOCUMENTS

| | | | | |
|---|---|---|---|---|
| FR | | 2991289 A1 * | 12/2013 | ............. B64C 27/48 |
| JP | | 2000234614 A | 8/2000 | |
| WO | WO 2010/141018 A1 | | 12/2010 | |
| WO | WO-2010141018 A1 * | | 12/2010 | ............. F16C 11/02 |
| WO | WO 2014/176208 A1 | | 10/2014 | |

OTHER PUBLICATIONS

Author Unknown, "Composite Self-Lubricating Bushings," AST Bearings. Mar. 15, 2015, [online] [retrieved on Sep. 27, 2018]. Retrieved from the Internet at https://web.archive.org/web/20150315014358/https://www.astbearings.com/composite-self-lubricating-bushings.html, 2015, 1 page.

Bergeson et al., "Damage Tolerant and Fail-Safe (DTFS) High Strength Preloaded Pin Assembly ", U.S. Appl. No. 15/073,155 , filed Mar. 17, 2016.

* cited by examiner

DAMAGE TOLERANT AND FAIL-SAFE (DTFS) HIGH STRENGTH PRELOADED PIN ASSEMBLY

TECHNICAL FIELD

The present teachings relate to the field of hinge assemblies and, more particularly to a hinge pin assembly that may be used, for example, as part of a rotor for a helicopter.

BACKGROUND

Lead-lag hinges or drag hinges are used on helicopter rotor blades to compensate for blade acceleration and deceleration resulting from the Coriolis effect during rotation. Lead-lag hinges include a pair of lead-lag bearings that extend over opposite ends of a lead-lag hinge pin. Each lead-lag bearing is secured in place with a separate bearing retainer, and the lead-lag bearings hold the lead-lag hinge pin in place. The lead-lag hinge extends through openings in a lead-lag link, a strap pack, and a pitch housing lug. The lead-lag hinge thereby attaches a rotor blade to a rotor assembly, while allowing the rotor blade to lead or lag the rotor assembly in rotation as the rotor blade rotates around the rotor assembly.

During use, the lead-lag hinges undergo high stresses and may be subject to fretting corrosion cracking as well as crack growth in fatigue. Failure of the lead-lag hinge pin can require emergency landing or catastrophic failure in flight. As such, the lead-lag hinges require inspection during maintenance and possible replacement to prevent catastrophic failure of the rotor assembly during use.

A lead-lag hinge with a higher strength and more robust design than previous designs would be a welcome addition to the art.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A hinge pin assembly according to the present teachings includes a shear bolt having a threaded first end and a threaded second end, an outer cylinder, wherein the shear bolt extends through an opening in the outer cylinder, a first nut threaded onto the threaded first end of the shear bolt, and a second nut threaded onto the threaded second end of the shear bolt, wherein an opposing force between the first nut and the second nut applies a compressive stress to the outer cylinder. The opposing force between the first nut and the second nut applies a tensile force to the shear bolt during the application of the compressive stress to the outer cylinder. The compressive stress applied to the outer cylinder is from 50 kilopound per square inch (KSI) to 100 KSI.

The hinge pin assembly may further include a first pin extender that physically contacts the first nut and a first end of the outer cylinder and a second pin extender that physically contacts the second nut and a second end of the outer cylinder. The hinge pin assembly may be, for example, part of a lead-lag hinge of a helicopter.

An embodiment may further include a first angled shoulder at a first end of the outer cylinder and a second angled shoulder at a second end of the outer cylinder, wherein the first nut physically contacts the first angled shoulder and the second nut physically contacts the second angled shoulder. The shear bolt can have a length of from, for example, 4.0 inches to 10.0 inches and a diameter of from 0.5 inches to 2.5 inches. The shear bolt, the outer cylinder, the first nut, and the second nut may each include at least one of steel, a non-ferrous alloy, a nickel-cobalt-chromium-molybdenum alloy, and combinations thereof.

The hinge pin assembly of claim 1 may further include a cap having an opening therethrough, wherein the threaded first end of the shear bolt extends through the opening in the cap, and a fastener, wherein the fastener extends through a lateral hole in the threaded first end of the shear bolt. A sealant may be positioned around a base of the cap.

In another embodiment, a lead-lag hinge can include a lead-lag link having a first opening and a second opening, a pitch housing lug having a slot therein, wherein a portion of the lead-lag link extends into the slot, and further including a first opening and a second opening therein, and a first lead-lag bearing having a first hinge pin receptacle therein, wherein the first lead-lag bearing extends into the first opening in the pitch housing lug. The lead-lag link further includes a second lead-lag bearing having a second hinge pin receptacle therein, wherein the second lead-lag bearing extends into the second opening in the pitch housing lug. The lead-lag hinge further includes a hinge pin assembly having a shear bolt having a threaded first end and a threaded second end, an outer cylinder, wherein the shear bolt extends through an opening in the outer cylinder, a first nut threaded onto the threaded first end of the shear bolt, and a second nut threaded onto the threaded second end of the shear bolt, wherein an opposing force between the first nut and the second nut applies a compressive stress to the outer cylinder. The first threaded end of the shear bolt is positioned within the first hinge pin receptacle of the first lead-lag bearing, the second threaded end of the shear bolt is positioned within the second hinge pin receptacle of the second lead-lag bearing, and the hinge pin assembly extends through the first opening in the pitch housing lug and the second opening in the pitch housing lug.

The opposing force between the first nut and the second nut may apply a tensile force to the shear bolt during the application of the compressive stress to the outer cylinder. The compressive stress applied to the outer cylinder may be from 50 kilopound per square inch (KSI) to 100 KSI. The lead-lag hinge may further include a first pin extender that physically contacts the first nut and a first end of the outer cylinder and a second pin extender that physically contacts the second nut and a second end of the outer cylinder. In one use, the lead-lag hinge may be part of a lead-lag hinge of a helicopter.

The lead-lag hinge can further include a first angled shoulder at a first end of the outer cylinder and a second angled shoulder at a second end of the outer cylinder, wherein the first nut physically contacts the first angled shoulder and the second nut physically contacts the second angled shoulder.

The shear bolt may have a length of from 4.0 inches to 10.0 inches and a diameter of from 0.5 inches to 2.5 inches. The shear bolt, the outer cylinder, the first nut, and the second nut may each include at least one of steel, a non-ferrous alloy, a nickel-cobalt-chromium-molybdenum alloy, and combinations thereof.

The lead-lag hinge may further include a first spacer that physically separates a first end of the outer cylinder from the first lead-lag bearing and a second spacer that physically separates a second end of the outer cylinder from the second lead-lag bearing.

A helicopter in accordance with an embodiment includes a plurality of lead-lag hinges. Each lead-lag hinge includes a lead-lag link having a first opening and a second opening, a pitch housing lug having a slot therein, wherein a portion of the lead-lag link extends into the slot, and further including a first opening and a second opening therein, a first lead-lag bearing including a first hinge pin receptacle therein, wherein the first lead-lag bearing extends into the first opening in the pitch housing lug, a second lead-lag bearing having a second hinge pin receptacle therein, wherein the second lead-lag bearing extends into the second opening in the pitch housing lug, and a hinge pin assembly. The hinge pin assembly includes a shear bolt including a threaded first end and a threaded second end, an outer cylinder, wherein the shear bolt extends through an opening in the outer cylinder, a first nut threaded onto the threaded first end of the shear bolt, and a second nut threaded onto the threaded second end of the shear bolt, wherein an opposing force between the first nut and the second nut applies a compressive stress to the outer cylinder, wherein the first threaded end of the shear bolt is positioned within the first hinge pin receptacle of the first lead-lag bearing, the second threaded end of the shear bolt is positioned within the second hinge pin receptacle of the second lead-lag bearing, and the hinge pin assembly extends through the first opening in the pitch housing lug and the second opening in the pitch housing lug. The helicopter further includes a plurality of blades and a plurality of pitch housings, wherein the plurality of blades are attached to the plurality of pitch housings with the plurality of lead-lag hinges.

BRIEF DESCRIPTION OF THE DRAWINGS

The accompanying drawings, which are incorporated in, and constitute a part of this specification, illustrate embodiments of the present teachings and, together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

An embodiment of the present teachings may include a lead-lag hinge including a hinge pin (i.e., a shear pin) having an outer cylinder or sheath and an inner bolt extending through the outer cylinder. During use, the outer cylinder is under a compressive stress while the inner bolt is under a tensile force. The present teachings are described below with reference to a lead-lag hinge for use in a helicopter rotor, but it will be appreciated that other uses, particularly other high-stress uses, are contemplated.

Figure 1:
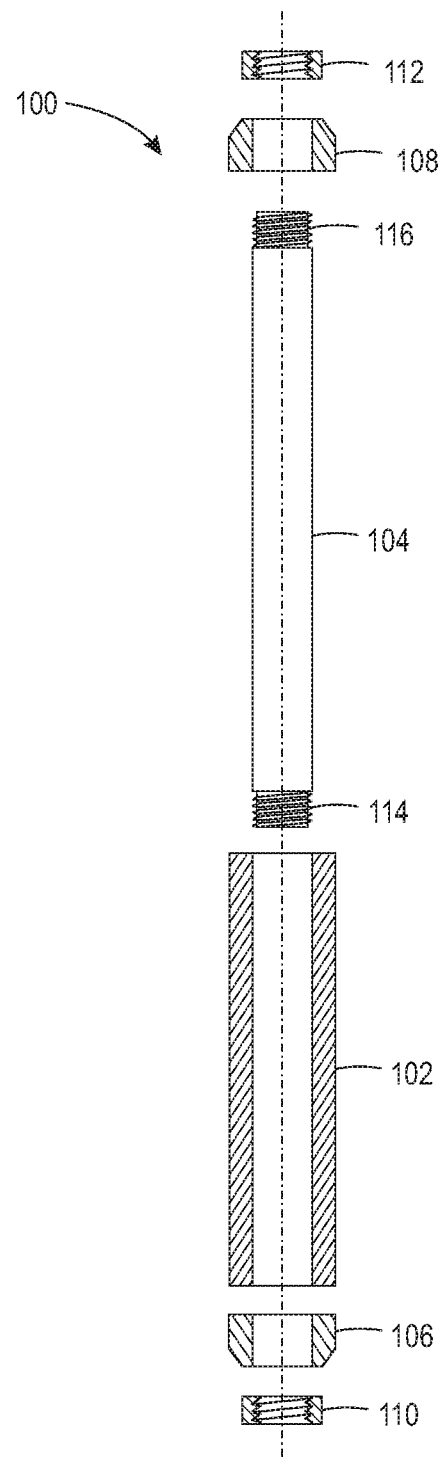
FIG. 1 is an exploded side view of a hinge pin assembly according to an embodiment.
Figure 2:
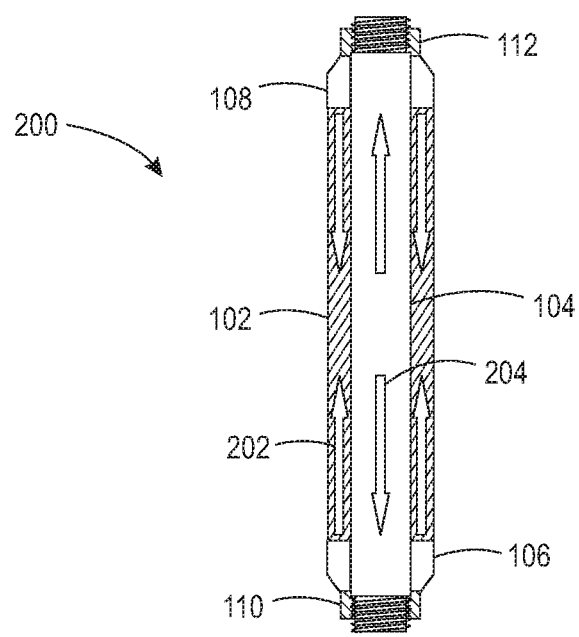
FIG. 2 is an assembled side view of the FIG. 1 hinge pin assembly according to an embodiment.

FIG. 1 is an exploded side view, and FIG. 2 is an assembled side view, of a hinge pin assembly 100 according to an embodiment of the present teachings. The assembled hinge pin assembly is generally denoted with the reference number 200. FIGS. 1 and 2 depict an outer cylinder or sleeve 102, a shear bolt 104, a first pin extender 106, a second pin extender 108, a first nut 110, and a second nut 112.

In an embodiment, the outer cylinder 102 is manufactured from a high-strength material capable of maintaining a large compressive preload. In an embodiment, the outer cylinder 102 may be manufactured from or include a material such as titanium and high-strength steels. The outer cylinder 102 may be or include a non-ferrous high-performance alloy, for example, MP35N®, which is a nickel-cobalt-chromium-molybdenum alloy available from Carpenter Technology Corporation of Wyomissing Pa. The outer cylinder 102 may be or include a high-performance alloy, for example, a nickel alloy, a cobalt alloy, a chromium alloy, a molybdenum alloy, and combinations of any of the foregoing. Other sufficient materials are contemplated. Further, the outer cylinder 102 may have an outer diameter of from about 0.75 inches to about 3.0 inches an inner diameter of from about 0.5 inches to about 2.5 inches, and a length of from about 4.0 inches to about 10.0 inches. It will be understood that the materials and dimensions described herein may vary depending on the particular design and use of the hinge pin assembly 100.

In an embodiment, the shear bolt 104 may be manufactured from or include a material such as titanium and high-strength steels, a non-ferrous high-performance alloy, for example, MP35N®, or one or more other sufficient materials. Further, the shear bolt 104 may have an outer diameter of from about 0.5 inches to about 2.5 inches and a length of from about 4.0 inches to about 10.0 inches.

The pin extenders 106, 108 as well as the nuts 110, 112 may be manufactured from a material such as titanium and high-strength steels, a non-ferrous high-performance alloy, for example, MP35N®, or one or more other sufficient materials. The dimensions of the pin extenders 106, 108 and the nuts 110, 112 will depend on the design of the outer cylinder 102 and the shear bolt 104, as well as the compressive and tensile forces described below.

To assemble the hinge pin assembly 100, the shear bolt 104 is inserted through the center of the outer cylinder 102, the first pin extender 106 is placed over a first end of the shear bolt 104, and threads of the first nut 110 are threaded onto threads 114 at threaded first end of the shear bolt 104. Subsequently, the second pin extender 108 is placed over a second end of the shear bolt 104, and threads of the second nut 112 are threaded onto threads 116 at a threaded second end of the shear bolt 104.

During the assembly of the hinge pin assembly 100 of FIG. 2, the first nut 110 and the second nut 112 may be tightened with an opposing force that preloads the outer cylinder 102 with a compressive stress (compression) 202, and also preloads the shear bolt 104 with a tensile force (tension) 204. The amount of allowable compressive stress placed on the outer cylinder 102 and tensile force placed on the shear bolt 104 will depend, for example, on the materials, dimensions, and design of each of the structures 102-112. In an embodiment, a compressive stress of from about 50 kilopound per square inch (KSI) to about 100 KSI may be placed and maintained (i.e., preloaded) on the outer cylinder 102 during assembly and use. Further, a tensile force of from about 25 KSI to about 140 KSI may be placed and maintained (i.e., preloaded) on the shear bolt 104 during assembly and use. The compressive stress preloaded on the outer cylinder 102 and the tensile force preloaded on the shear bolt may vary depending on the materials and dimensions of the structures.

Figure 3:
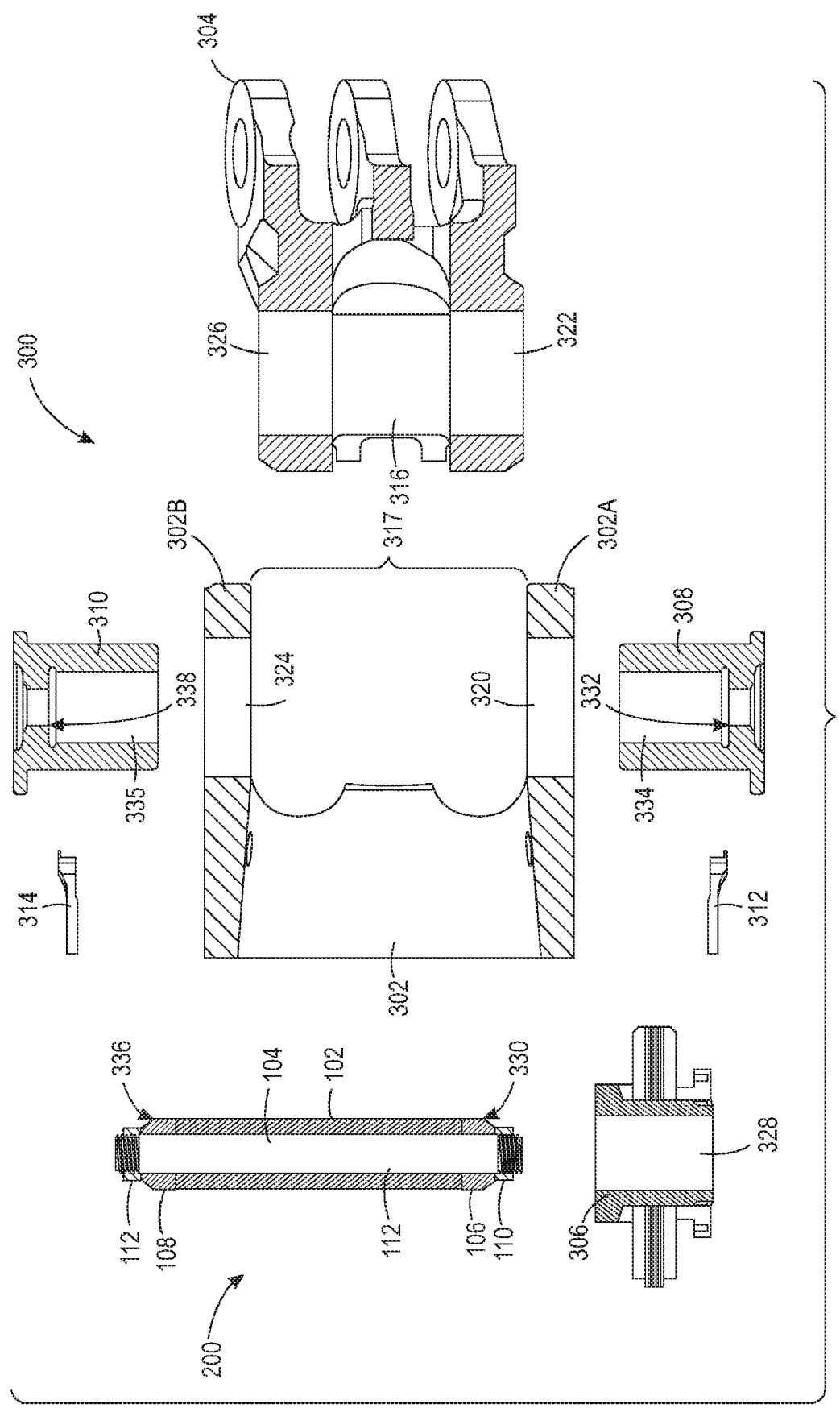
FIG. 3 is a disassembled side view of a lead-lag hinge including the hinge pin assembly of FIG. 2.
Figure 4:
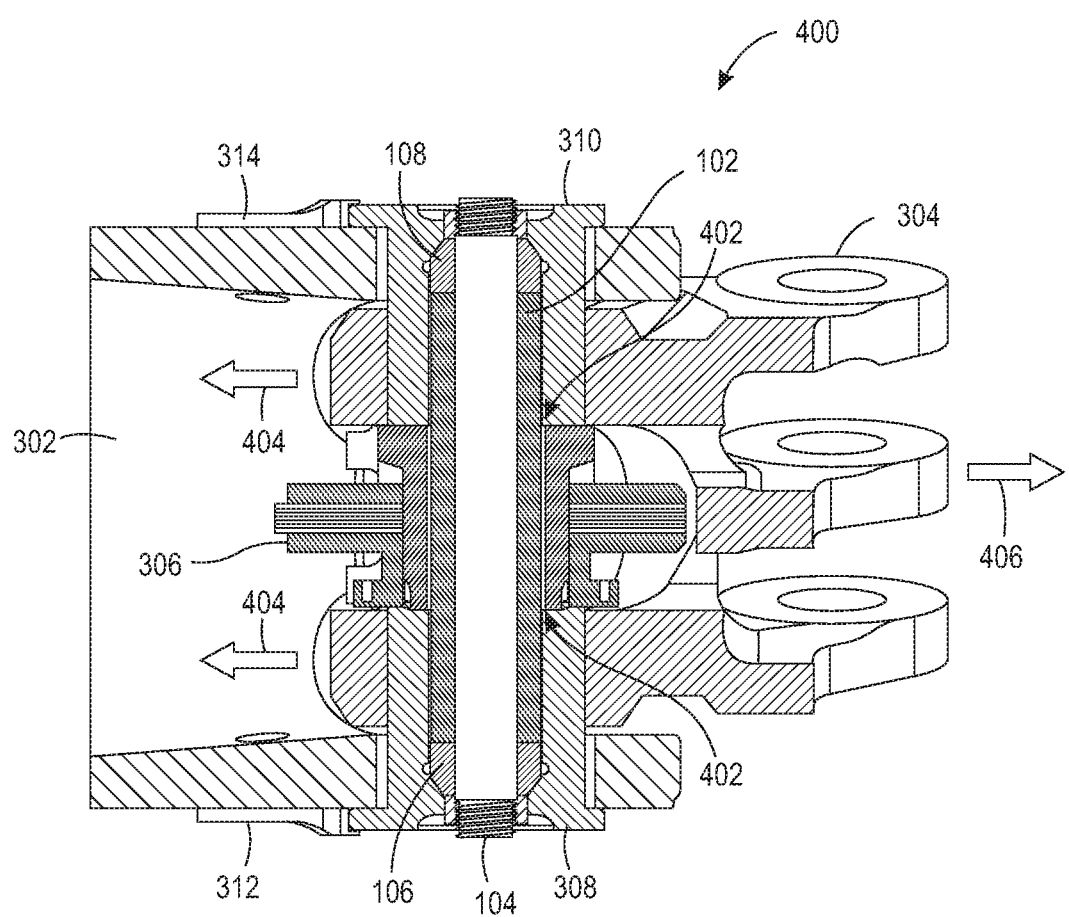
FIG. 4 is an assembled side view of a lead-lag hinge including the hinge pin assembly of FIG. 2.

FIG. 3 is a disassembled side view, and FIG. 4 is an assembled side view, of the hinge pin assembly 100 of FIGS. 1 and 2 during use as part of a lead-lag hinge 300. The depicted lead-lag hinge 300 includes the assembled hinge pin assembly 200, a pitch housing lug 302, a lead-lag link 304, a strap pack 306, a first lead-lag bearing 308, a second lead-lag bearing 310, a first bearing retainer 312, and a second bearing retainer 314. Lead-lag hinge designs, such as those used in the Boeing AH-64 Apache helicopter, are known in the art. The assembled lead-lag hinge 300 is depicted in FIG. 4 and generally identified by the reference number 400.

To assemble the FIG. 3 structure, the strap pack 306 is inserted into a strap pack chamber 316 in the lead-lag link 304, then the strap pack 306 and a portion of the lead-lag link 304 are inserted into a slot 317 in the pitch housing lug 302. The first lead-lag bearing 308 is placed into a first opening 320 through the pitch housing lug 302, and also extends into a first opening 322 in the lead-lag link 304. The first lead-lag bearing 308 may be subsequently secured into place by the first bearing retainer 312.

Next, the assembled hinge pin assembly 200 is inserted into a second opening 324 in the pitch housing lug 302, through a second opening 326 in the lead-lag link 304, through an opening 328 in the strap pack 306, through the first opening 320 in the pitch housing lug 302, and into a hinge pin assembly receptacle 334 in the first lead-lag bearing 308. A shoulder 330 of the first pin extender 106 should not physically contact a shoulder 332 of the first lead-lag bearing 308, however, contact may occur during use thereby preventing the departure of the hinge pin assembly 200 from within the first lead-lag bearing 308.

Subsequently, the second lead-lag bearing 310 may be placed into the second opening 324 through the pitch housing lug 302, and may also extend into the second opening 326 in the lead-lag link 304. This positions the hinge pin assembly 200 into a hinge pin assembly receptacle 335 in the second lead-lag bearing 310. The second lead-lag bearing 310 may be subsequently secured into place by the second bearing retainer 314. An optional shoulder 336 of the second pin extender 108 may physically contacts a shoulder 338 of the second lead-lag bearing 310 as depicted in FIG. 4.

It will be appreciated that the pitch housing lug 302 forms a clevis including a first end 302A defining a first bore 320 (i.e., the opening 320 through the pitch housing lug 302) and a second end 302B defining a second bore 324 (i.e., the opening 324 in the pitch housing lug 302). The strap pack 306 functions as a reaction load member for the clevis and defines a third bore 328 (i.e., the opening 328 in the strap pack 306).

Figure 5:
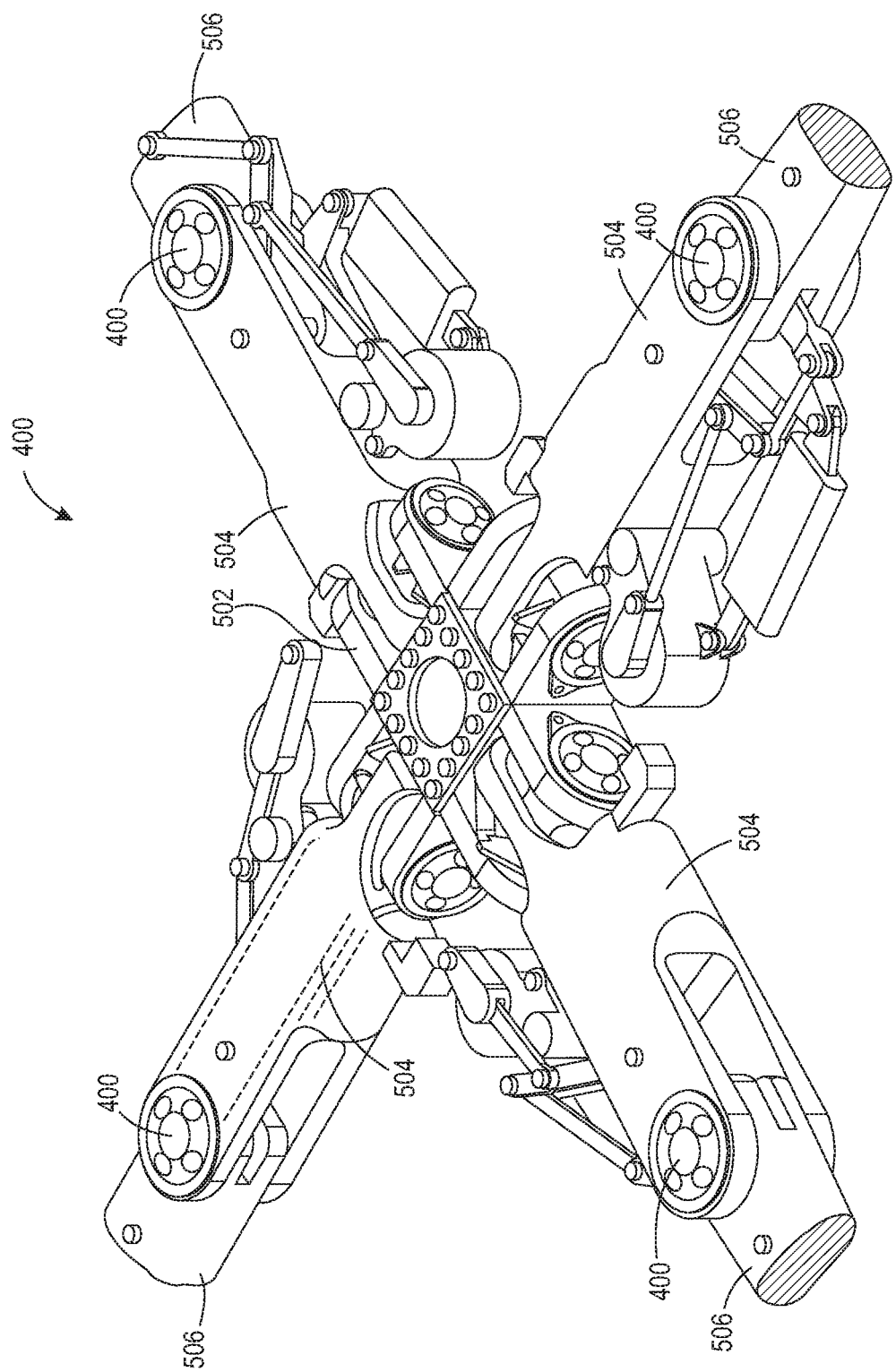
FIG. 5 is a perspective depiction of part of a helicopter rotor system including the hinge pin assembly of FIG. 4.
Figure 6:
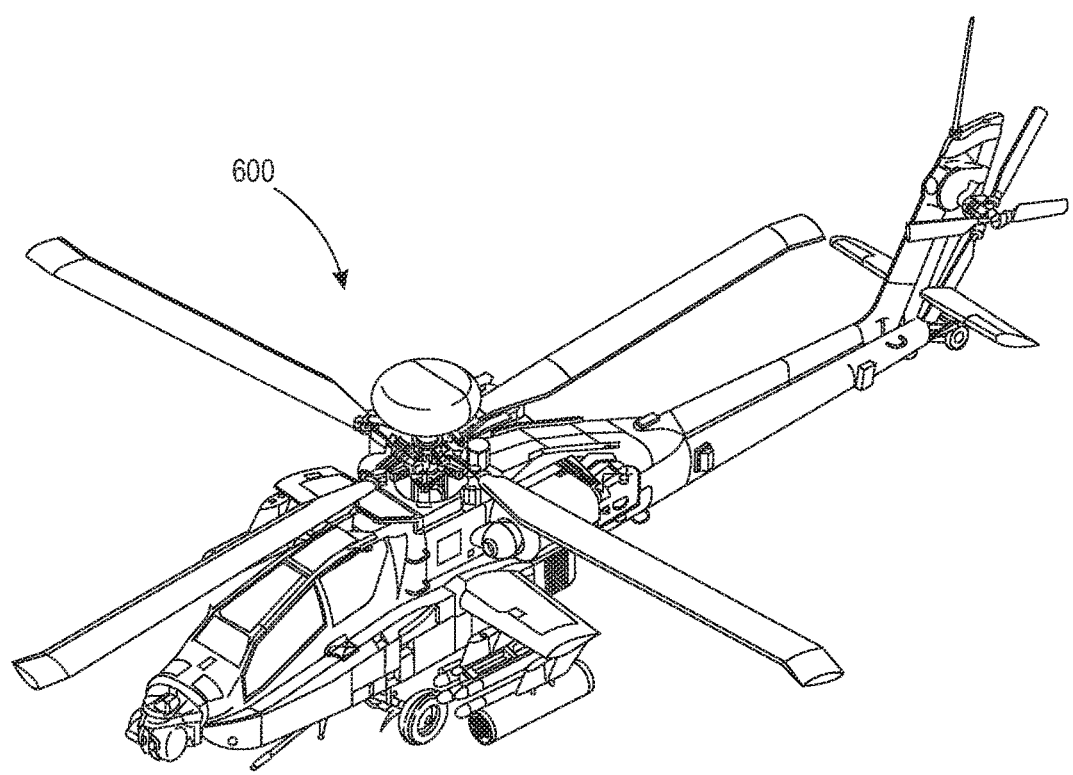
FIG. 6 is a side view of a helicopter including the helicopter rotor system of FIG. 5.

A plurality of assembled lead-lag hinges similar to the assembled lead-lag hinge 400 FIG. 4 may be positioned within a helicopter rotor system 500 as depicted in the perspective view of FIG. 5. The helicopter rotor system 500 of FIG. 5 includes a rotor hub 502 attached to a plurality of pitch housings 504. The plurality of pitch housings 504 are attached to a plurality of blades 506 with a plurality of lead-lag hinges 400. In FIG. 5, four blades 506 and four lead-lag hinges 400 are depicted. The helicopter rotor system 500 may be assembled and positioned as part of a helicopter 600 such as that depicted in the side view of FIG. 6.

During use, the lead-lag hinge undergoes high stresses and the lead-lag hinge pin assembly is subject to fretting corrosion cracking as well as crack growth in fatigue. During use, the outer cylinder 102 is the primary load-carrying member and subject to bending and shearing. However, the lead-lag hinge pin assembly 200 and, more particularly, the outer cylinder 102, is under constant compression 202 from the nuts 110, 112 that are threaded and torqued onto the shear bolt 104. The outer cylinder 102 functions as a crack-arresting mechanism if surface damage is incurred on the outer cylinder 102 and, once surface cracking occurs, the compressive stresses on the outer cylinder 102 reduce further cracking. By maintaining the outer cylinder 102 in compression or under a compressive stress during use, the outer cylinder 102 is placed into an initial compressive state which creates a structural advantage in resisting cyclic fatigue. Additionally, this initial compressive state inhibits the propagation of cracks through the outer cylinder 102. Cracks in the outer cylinder 102 may begin to form from, for example, surface defects formed during manufacture or from surface wear or fatigue accumulated over time.

Thus an opposing force between the first nut and the second nut applies a compressive stress to the outer cylinder that increases a resistance of the hinge pin assembly crack initiation and/or propagation. Placing the outer cylinder under a compressive stress during use results in a more robust hinge pin that has reduced fatigue and is therefore less likely to fail compared to some prior hinge pins. In addition, even in the case of complete failure of the outer cylinder during use, the shear bolt through the outer cylinder maintains some structural integrity of the hinge pin. The hinge pin assembly thus provides a fail-safe hinge and hinge pin system, for example, a lead-lag hinge.

Figure 7:
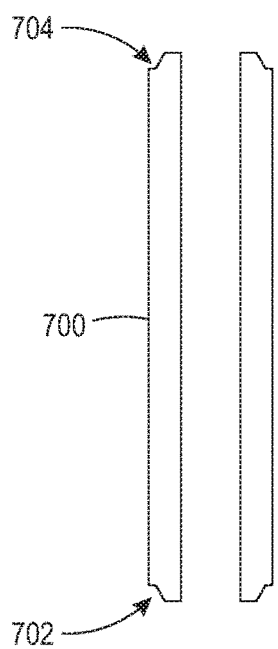
FIG. 7 is a cross section of an outer cylinder according to an embodiment of the present teachings.

It will be appreciated that a lead-lag hinge may include other structures that are not depicted for simplicity, while depicted structures may be removed or modified. For example, FIG. 7 is a side view depicting an outer cylinder 700 that is manufactured such that pin extenders 106, 108 as described are not used. The outer cylinder 700 may include an optional first shoulder 702 and an optional second shoulder 704 that may function similar to the shoulders 330, 336 of the pin extenders 106, 108 described above. The outer cylinder 700 thus has a functionality similar to that of the combined outer cylinder 102 and pin extenders 106, 108 of FIG. 2, but is a single integrated structure having a lower manufacturing cost.

Figure 8:
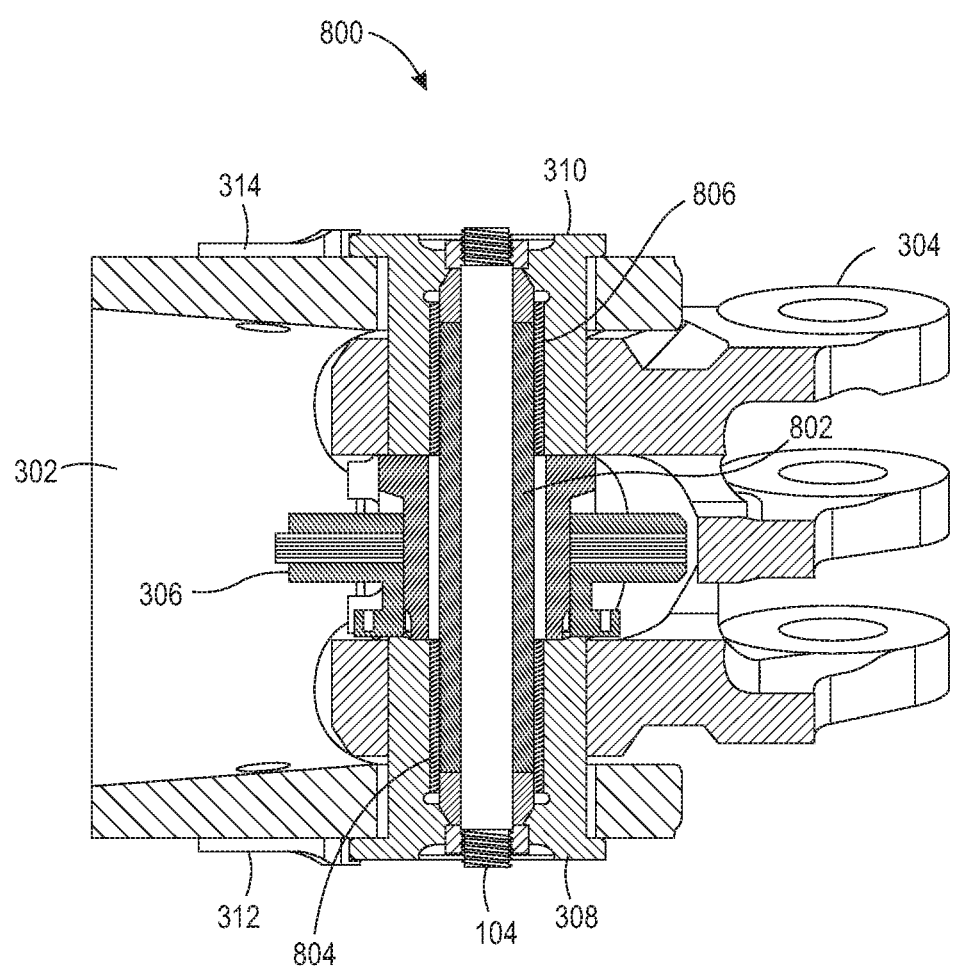
FIG. 8 is an assembled side view of another lead-lag hinge including a hinge pin assembly according to the present teachings.

In the embodiment of FIG. 4 which depicts a type of double shear joint, it will be appreciated that locations 402 of the outer cylinder 102 encounter particularly high shear stresses during use of the assembled lead-lag hinge 400. For example, during use, lateral movement of the lead-lag link 304 imparts high shear stress concentrated at locations 402 of the outer cylinder 102 from physical contact between the outer cylinder 102 and the lead lag bearings 308, 310 at locations 402. The shear stresses result from a reaction load 406 that opposes an applied load 404 during use and operation of the assembled lead-lag hinge 400. Thus the outer cylinder 102 is particularly susceptible to fracturing or other failure at locations 402. Further, surface wear or damage to the outer cylinder can occur, for example, from the bearing inside diameter at locations 402. FIG. 8 depicts an assembled lead-lag hinge 800 including an outer cylinder 802, a first spacer 804 positioned between the outer cylinder 802 and the first lead-lag bearing 308, and a second spacer 806 positioned between the outer cylinder 802 and the second lead-lag bearing 310. The spacers 804, 806 include or provide low-friction liners on the inside diameter of the bearing which allow minute motions by adjacent structures against the liners while decreasing or eliminating damage to components or structures in physical contact with the liners.

In an embodiment, the first spacer 804 and the second spacer 806 may be individual structures, for example, individual ring-shaped liners that are positioned around the outer cylinder 802 during assembly of the lead-lag hinge 800. In this embodiment, the spacers 804, 806 may be or include at least one of a metal or a phenolic material, and may further include material such as polytetrafluoroethylene (PTFE) or another polymer to provide a low friction contact with adjacent structures. Other materials are contemplated. The spacers 804, 806 may thus provide for a more fracture-resistant double shear joint.

Figure 9:
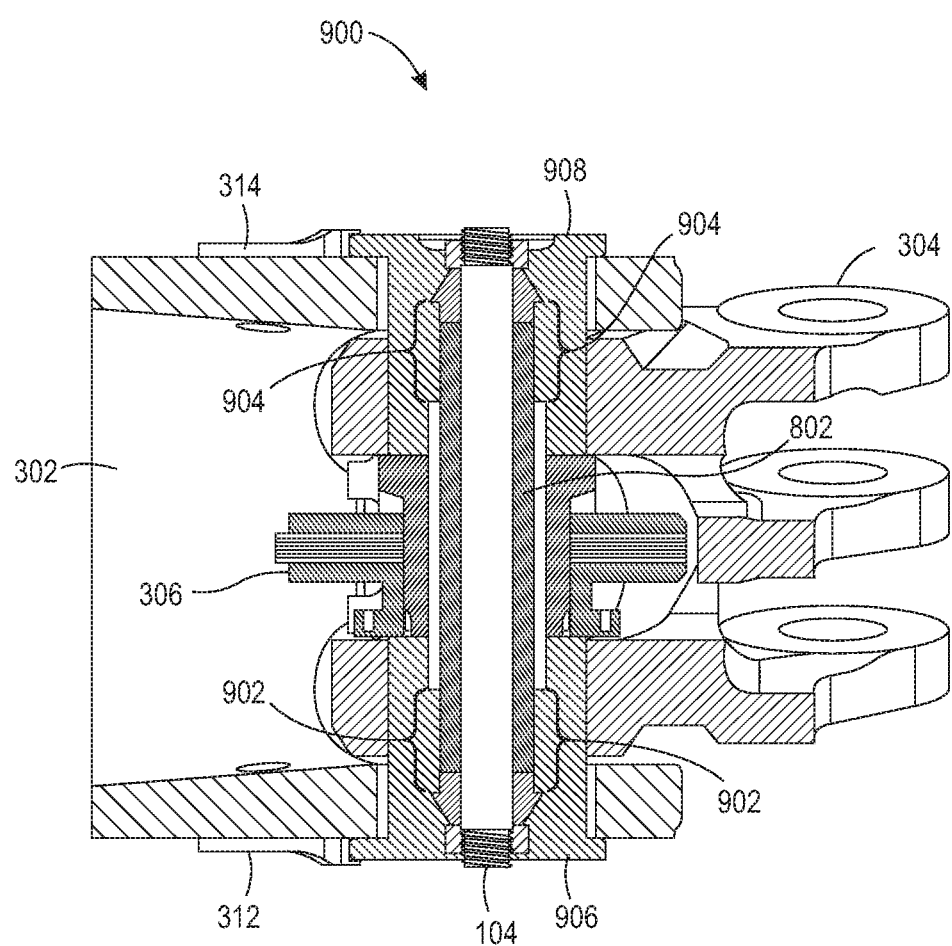
FIG. 9 is an assembled side view of another lead-lag hinge including the hinge pin assembly according to the present teachings.

FIG. 9 depicts another embodiment of an assembled lead-lag hinge 900 in which a first spacer 902 and a second spacer 904 are formed as a stepped protrusion of a first lead-lag bearing 906 and a second lead-lag bearing 908 respectively. In this embodiment, the highest shear stress is placed on the hinge pin, more particularly on the outer cylinder 802, at the edges of the stepped protrusions of the first lead-lag bearing 906 and the second lead-lag bearing 908 (e.g., analogous to regions 1210 as described below with reference to FIG. 12). Failure such as breakage of the outer cylinder 802 and the shear bolt 104 of the hinge pin will typically occur at this location. In this embodiment, if failure occurs, the shear bolt 104 and/or the outer cylinder can shift laterally but will still be supported by either the first bearing 906 or the second bearing 908, depending on the point of failure. While such a failure may result in vibration of the lead-lag hinge 900 during continued use, the lead-lag hinge 900 will continue to function at least temporarily, thereby avoiding an immediate catastrophic failure of the joint.

Figure 10:
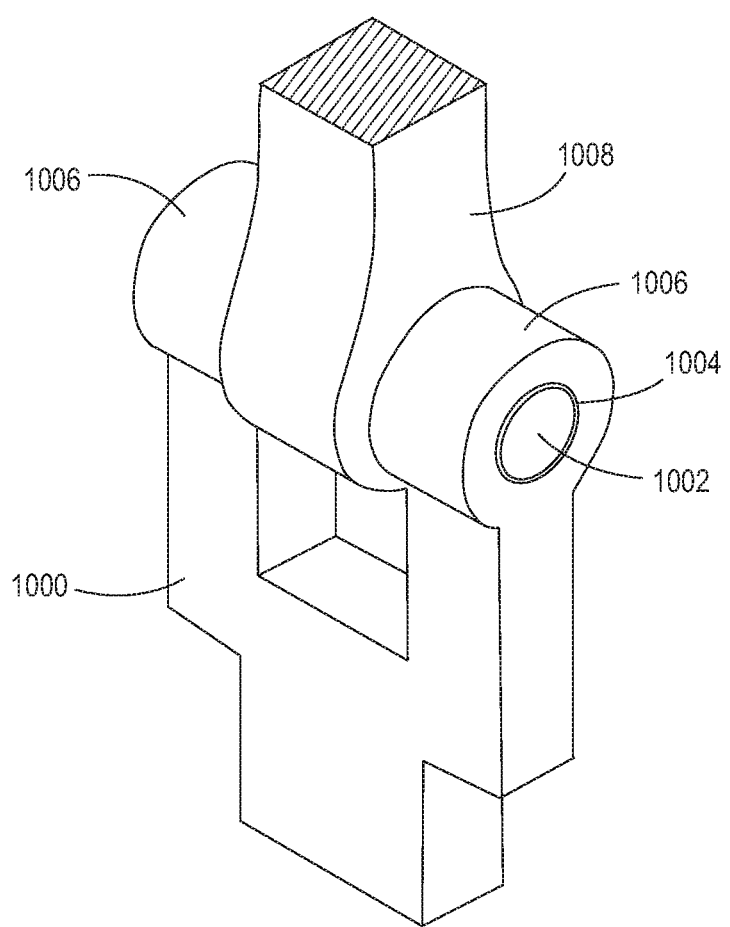
FIG. 10 is a perspective depiction of a clevis, reaction load member, and hinge pin assembly according to the present teachings.

It will be appreciated that embodiments of the hinge pin assembly can be used with various types of double shear joints such as the lead-lag hinge pin assemblies 400, 800, 900 as described above, as well as the clevis 1000 depicted in FIG. 10. FIG. 10 depicts a hinge pin 1002 including a spacer 1004 that physically spaces the hinge pin 1002 from physical contact with clevis arms 1006 and a reaction load member 1008. In this embodiment, the hinge pin 1002 includes a single pin that extends through holes in the clevis arms 1006 and a hole in the reaction load member 1008. In this embodiment, the hinge pin 1002 does not include an outer cylinder as described with previous embodiments, although the use of a hinge pin assembly including a shear bolt and an outer cylinder that function as a hinge pin is also contemplated.

As depicted, the lead-lag hinge pin assemblies 400 (FIG. 4), 800 (FIG. 8), 900 (FIG. 9) and the clevis 1000 (FIG. 10) all include a pair of colinear bores (i.e., first and second bores) defined by a pair of ends (i.e., first and second ends) through which the hinge pin assembly extends. The reaction load member, for example reaction load member 1008 of FIG. 10, defines a third bore that is colinear with the pair of bores. The hinge pin assembly also extends through the third bore. If used, the one or more spacers, for example, spacers 804, 806 (FIG. 8) and spacers 1004 (FIG. 10) are configured to physically space the hinge pin assembly from the reaction load member defining the third bore, and may provide a low-friction liner as described above. Further, the spacers prevent physical contact between the hinge pin assembly and the first and second ends when the hinge pin assembly is positioned through the first, second, and third bores. Additionally, the spacers space the hinge pin assembly from the reaction load member that defines the third bore.

Figure 11:
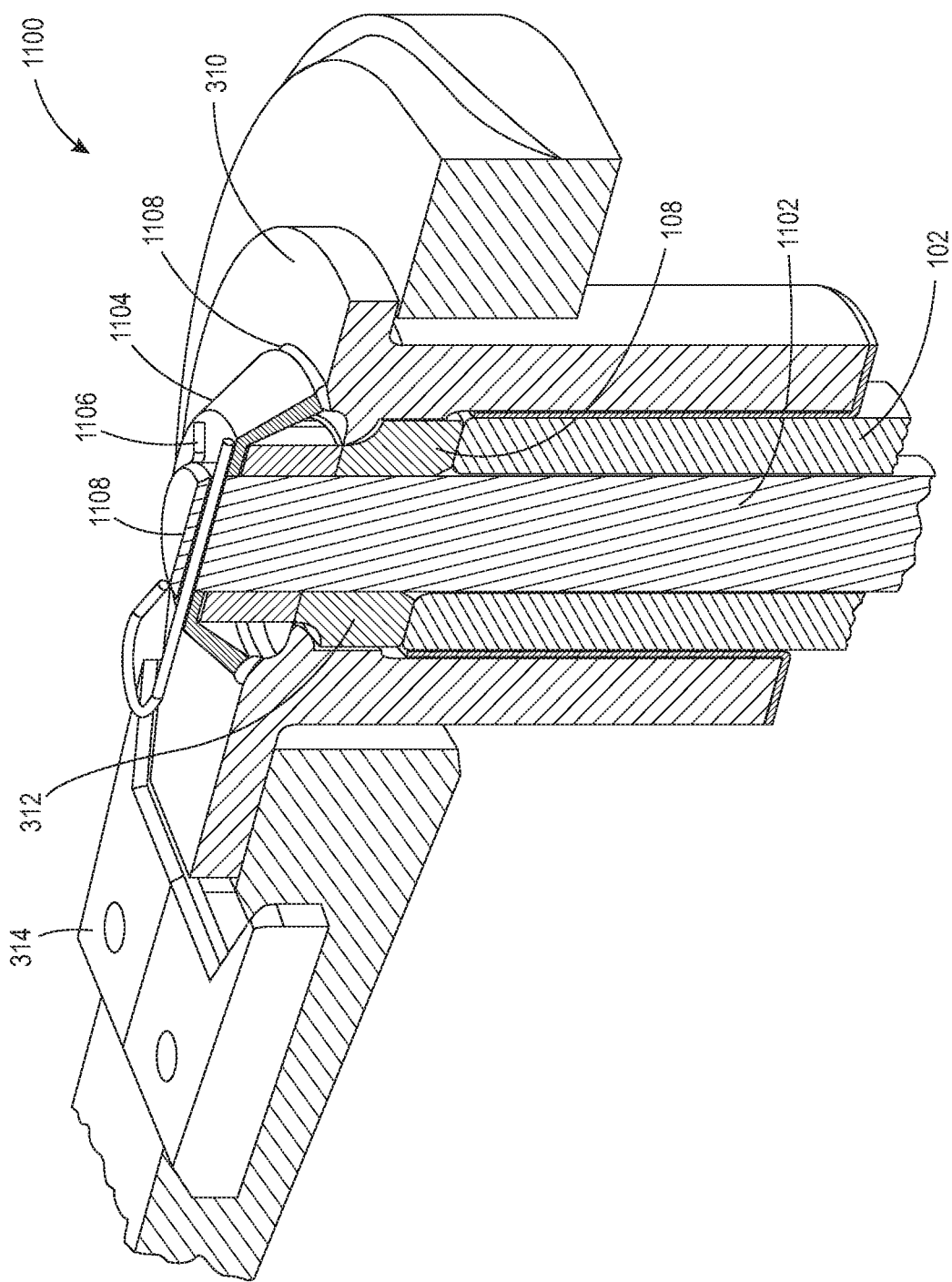
FIG. 11 is a cutaway perspective depiction of a hinge assembly according to the present teachings.

FIG. 11 is a perspective cutaway depiction of a hinge assembly 1100 including an attachment assembly that secures the hinge pin in place. The attachment assembly also seals the hinge pin assembly to reduce contamination that could increase wear of the hinge pin assembly. While FIG. 11 depicts one end of a hinge pin 1102, an opposite end of the hinge pin 1102 (not depicted for simplicity) may include similar structures or different structures. In FIG. 11, the hinge pin 1102 extends through an opening in a cap 1104. A fastener such as a cotter pin 1106 may extend through a hole that extends laterally through the end of the hinge pin 1102. As known in the art, a spring action of the cotter pin 1106, at least in part, maintains the position of the cotter pin 1106 within the hole through the hinge pin 1102. The fastener further holds the cap 1104 in place against the bearing 310 as depicted. A sealant 1108, for example, a polymer adhesive, a metallic solder, or another adhesive or sealant, may be placed around a base of the cap and on a surface of the lead-lag bearing 310. The sealant reduces or prevents encroachment of contamination into the region of the hinge pin 1102. The attachment of the fastener 1106 and the cap 1104 may further prevent the nut 112 from loosening during use of the hinge assembly 1100.

Figure 12:
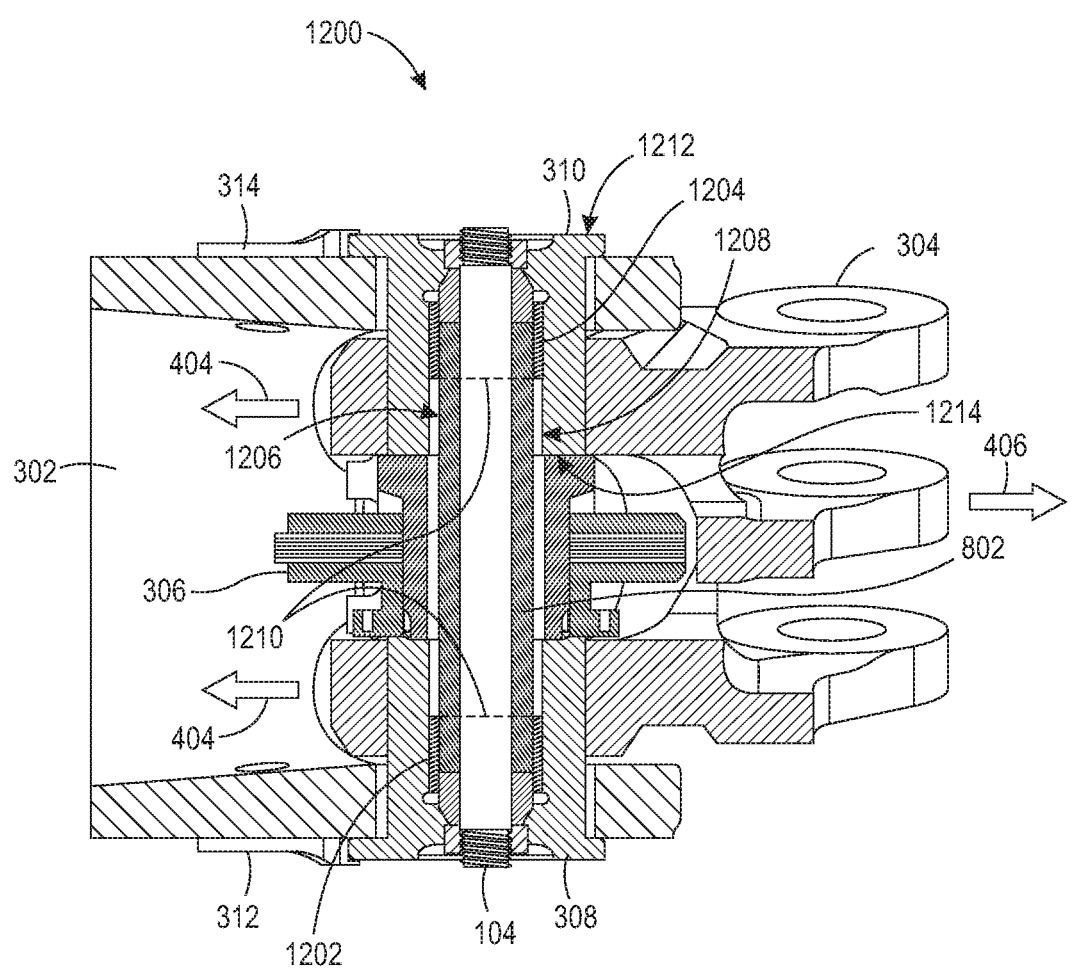
FIG. 12 is an assembled side view of another lead-lag hinge including a hinge pin assembly according to the present teachings.

FIG. 12 depicts an assembled lead-lag hinge 1200 including first spacers 1202 and second spacers 1204 that are modified compared to the first spacers 804 and the second spacers 806 of the FIG. 8 embodiment. In the FIG. 8 embodiment, the spacers 804, 806 are aligned with an edge of the member they physically contact, more specifically, the bearings 308, 310. In the embodiment of FIG. 12, the spacers 1202, 1204 are positioned between, and physically contact, a surface 1206 of the hinge pin assembly 100 and a surface opposite the surface of the hinge pin assembly 100. The surface 1206 of the hinge pin assembly 100 may be, for example, a surface of the outer cylinder 802 as depicted, a surface of the shear bolt 104 if an outer cylinder 802 is not used, a hinge pin 1002, or another hinge pin assembly surface. The surface that is opposite to the surface of the hinge pin assembly may be, for example, a surface of a lead-lag bearing 308, 310 as depicted, a surface of a clevis, or another surface. In this embodiment, the spacers 1202, 1204 have a shorter height compared to the spacers 804, 806 of FIG. 8. In FIG. 12, the spacers 1202, 1204 a portion of the surface 1208 is not covered by the spacers 1202, 1204, and thus a portion of the surface 1208 is free from physical contact with the spacers 1202, 1204. During use of the FIG. 12 structure, an area of highest shear stress 1210 of the hinge pin assembly 100 and, more particularly, the outer cylinder 802, is at an edge or lower extent of the spacers 1202, 1204. In other words, an edge of the spacers 1202, 1204 define an area of highest stress 1210 of the hinge pin assembly during use. In this embodiment, the area of highest stress 1210 is located at an intermediate position between a first extent 1212 and a second extent 1214 of the member 308, 310 to which the spacer 1202, 1204 is attached, and is not at an edge of the member 308, 310 as it is in the embodiments of FIGS. 4 and 8. In FIG. 8, if the hinge pin assembly 100 fractures at the area of highest stress (e.g., the edge of the spacer 804, 806), the outer cylinder 802 may slide out of the lead-lag bearings 308, 310. In FIG. 12, if the hinge pin assembly 100 fractures at the area of highest stress (e.g., the edge of the spacer 1202, 1204), the outer cylinder 802 will physically contact and engage the lead-lag bearing, thereby providing a more fail tolerant hinge pin assembly 100. In other words, a fracture of the outer cylinder 802 (or other hinge pin assembly 100 structures) results in lateral movement of the outer cylinder 802 such that it physically contacts the lead-lag bearing 308, 310. While such a failure may result in vibration of the lead-lag hinge 1200 during continued use, the lead-lag hinge 1200 will continue at least temporarily, thereby avoiding an immediate catastrophic failure of the joint. Thus the lead-lag hinge 1200 of FIG. 12 is configured such that, prior to fracture, the outer cylinder 802 does not physically contact the lead-lag bearings 308, 310. Subsequent to fracture, the outer cylinder 802 may physically contact, and be supported by, one of the lead-lag bearings 308, 310, such that the lead-lag bearing 1200 continues to function without complete failure.

In describing the FIG. 12 structure as a clevis structure, each spacer 1202, 1204, and the edges of each spacer 1202, 1204, are completely positioned between an upper extent and a lower extent of the ends of the clevis. The edges of the each spacer 1202, 1204 do not align with either an upper extent or a lower extent of each clevis, but are positioned within the bore defined by the respective ends. If the hinge pin assembly fractures at the area of highest stress (e.g., the edge of the spacer 1202, 1204), the hinge pin assembly will physically contact and engage the respective end of the clevis, and be supported by the respective end of the clevis, thereby providing a more fail tolerant hinge pin assembly. In other words, a fracture of a part of the hinge pin assembly may result in lateral movement of the hinge pin assembly such that it physically contacts the clevis.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A hinge pin assembly, comprising:
a shear bolt comprising a threaded first end and a threaded second end;

an outer cylinder having a length, wherein the shear bolt extends through an opening in the outer cylinder;

a first nut threaded onto the threaded first end of the shear bolt;

a second nut threaded onto the threaded second end of the shear bolt, wherein an opposing force between the first nut and the second nut applies a compressive stress to the outer cylinder along the length of the outer cylinder in a direction parallel to the length of the outer cylinder;

a first bearing comprising a first hinge pin receptacle therein, wherein the first bearing is configured to extend into a first opening in a pitch housing lug;

a second bearing comprising a second hinge pin receptacle therein, wherein the second bearing is configured to extend into a second opening in a pitch housing lug;

a first spacer that physically separates a first end of the outer cylinder from the first bearing, wherein the first spacer is positioned between the first bearing and the outer cylinder; and a second spacer that physically separates a second end of the outer cylinder from the second bearing, wherein the second spacer is positioned between the second bearing and the outer cylinder.

2. The hinge pin assembly of claim 1, wherein the opposing force between the first nut and the second nut applies a tensile force to the shear bolt during the applying of the compressive stress to the outer cylinder.

3. The hinge pin assembly of claim 1, wherein the compressive stress applied to the outer cylinder is from 50 kilopound per square inch (KSI) to 100 KSI.

4. The hinge pin assembly of claim 1, further comprising:
a first pin extender that physically contacts the first nut and a first end of the outer cylinder; and
a second pin extender that physically contacts the second nut and a second end of the outer cylinder.

5. The hinge pin assembly of claim 1, wherein the hinge pin assembly is part of a lead-lag hinge of a helicopter.

6. The hinge pin assembly of claim 1, further comprising:
a first angled shoulder at a first end of the outer cylinder; and
a second angled shoulder at a second end of the outer cylinder,
wherein the first nut physically contacts the first angled shoulder and the second nut physically contacts the second angled shoulder.

7. The hinge pin assembly of claim 1, wherein the shear bolt has a length of from 4.0 inches to 10.0 inches and a diameter of from 0.5 inches to 2.5 inches.

8. The hinge pin assembly of claim 1, wherein the shear bolt, the outer cylinder, the first nut, and the second nut each comprise at least one of steel, a non-ferrous alloy, a nickel-cobalt-chromium-molybdenum alloy, and combinations thereof.

9. The hinge pin assembly of claim 1, further comprising:
a cap having an opening therethrough, wherein the threaded first end of the shear bolt extends through the opening in the cap; and
a fastener, wherein the fastener extends through a lateral hole in the threaded first end of the shear bolt.

10. The hinge pin assembly of claim 9, further comprising a sealant around a base of the cap.

11. A lead-lag hinge, comprising:
a lead-lag link comprising a first opening and a second opening;

a pitch housing lug comprising a slot therein, wherein a portion of the lead-lag link extends into the slot, and further comprising a first opening and a second opening therein;

a first lead-lag bearing comprising a first hinge pin receptacle therein, wherein the first lead-lag bearing extends into the first opening in the pitch housing lug;

a second lead-lag bearing comprising a second hinge pin receptacle therein, wherein the second lead-lag bearing extends into the second opening in the pitch housing lug;

a hinge pin assembly, comprising:
a shear bolt having a length comprising a threaded first end and a threaded second end;
an outer cylinder having a length, wherein the shear bolt extends through an opening in the outer cylinder;
a first nut threaded onto the threaded first end of the shear bolt; and
a second nut threaded onto the threaded second end of the shear bolt, wherein:
an opposing force between the first nut and the second nut applies a compressive stress to the outer cylinder along the length of the outer cylinder in a direction parallel to the length of the outer cylinder; and
the first threaded end of the shear bolt is positioned within the first hinge pin receptacle of the first lead-lag bearing, the second threaded end of the shear bolt is positioned within the second hinge pin receptacle of the second lead-lag bearing, and the hinge pin assembly extends through the first opening in the pitch housing lug and the second opening in the pitch housing lug;

a first spacer that physically separates a first end of the outer cylinder from the first lead-lag bearing, wherein the first spacer is positioned between the first lead-lag bearing and the outer cylinder; and a second spacer that physically separates a second end of the outer cylinder from the second lead-lag bearing, wherein the second spacer is positioned between the second lead-lag bearing and the outer cylinder.

12. The lead-lag hinge of claim 11, wherein the opposing force between the first nut and the second nut applies a tensile force to the shear bolt during the applying of the compressive stress to the outer cylinder.

13. The lead-lag hinge of claim 11, wherein the compressive stress applied to the outer cylinder is from 50 kilopound per square inch (KSI) to 100 KSI.

14. The lead-lag hinge of claim 11, further comprising:
a first pin extender that physically contacts the first nut and a first end of the outer cylinder; and
a second pin extender that physically contacts the second nut and a second end of the outer cylinder.

15. The lead-lag hinge of claim 11, wherein the lead-lag hinge is part of a lead-lag hinge of a helicopter.

16. The lead-lag hinge of claim 11, further comprising:
a first angled shoulder at a first end of the outer cylinder; and
a second angled shoulder at a second end of the outer cylinder,
wherein the first nut physically contacts the first angled shoulder and the second nut physically contacts the second angled shoulder.

17. The lead-lag hinge of claim 11, wherein the shear bolt has a length of from 4.0 inches to 10.0 inches and a diameter of from 0.5 inches to 2.5 inches.

18. The lead-lag hinge of claim 11, wherein the shear bolt, the outer cylinder, the first nut, and the second nut each comprise at least one of steel, a non-ferrous alloy, a nickel-cobalt-chromium-molybdenum alloy, and combinations thereof.

19. A helicopter, comprising:
a plurality of lead-lag hinges, wherein each lead-lag hinge comprises:
  a lead-lag link comprising a first opening and a second opening;
  a pitch housing lug comprising a slot therein, wherein a portion of the lead-lag link extends into the slot, and further comprising a first opening and a second opening therein;
  a first lead-lag bearing comprising a first hinge pin receptacle therein, wherein the first lead-lag bearing extends into the first opening in the pitch housing lug;
  a second lead-lag bearing comprising a second hinge pin receptacle therein, wherein the second lead-lag bearing extends into the second opening in the pitch housing lug;
  a hinge pin assembly, comprising:
    a shear bolt comprising a threaded first end and a threaded second end;
    an outer cylinder having a length, wherein the shear bolt extends through an opening in the outer cylinder;
    a first nut threaded onto the threaded first end of the shear bolt; and
    a second nut threaded onto the threaded second end of the shear bolt, wherein an opposing force between the first nut and the second nut applies a compressive stress to the outer cylinder along the length of the outer cylinder in a direction parallel to the length of the outer cylinder,
    wherein the first threaded end of the shear bolt is positioned within the first hinge pin receptacle of the first lead-lag bearing, the second threaded end of the shear bolt is positioned within the second hinge pin receptacle of the second lead-lag bearing, and the hinge pin assembly extends through the first opening in the pitch housing lug and the second opening in the pitch housing lug;
  a first spacer that physically separates a first end of the outer cylinder from the first lead-lag bearing, wherein the first spacer is positioned between the first lead-lag bearing and the outer cylinder; and
  a second spacer that physically separates a second end of the outer cylinder from the second lead-lag bearing, wherein the second spacer is positioned between the second lead-lag bearing and the outer cylinder;
a plurality of blades; and
a plurality of pitch housings, wherein the plurality of blades are attached to the plurality of pitch housings with the plurality of lead-lag hinges.

20. The helicopter of claim 19, wherein each lead-lag hinge further comprises:
a first angled shoulder at a first end of the outer cylinder; and
a second angled shoulder at a second end of the outer cylinder,
wherein the first nut physically contacts the first angled shoulder and the second nut physically contacts the second angled shoulder.

* * * * *